United States Patent [19]

Hurner

[11] Patent Number: 5,431,138
[45] Date of Patent: Jul. 11, 1995

[54] OIL CLEANING AND RECYCLING SYSTEM

[76] Inventor: Erwin E. Hurner, 920 Belsly Blvd. S., Moorhead, Minn. 56560

[21] Appl. No.: 202,291

[22] Filed: Feb. 25, 1994

[51] Int. Cl.⁶ ............................................. F01M 11/04
[52] U.S. Cl. ............................. 123/196 A; 123/196 S; 184/1.5
[58] Field of Search .......... 123/196 S, 196 A, 73 AD; 184/1.5; 417/63

[56] References Cited

U.S. PATENT DOCUMENTS

| | | | |
|---|---|---|---|
| 4,421,078 | 12/1983 | Hurner | 123/196 S |
| 4,495,909 | 1/1985 | Hurner | 123/196 A |
| 4,572,120 | 2/1986 | Matsumoto | 123/196 S |
| 4,615,305 | 10/1986 | Matsumoto | 123/73 AD |
| 4,674,456 | 6/1987 | Merritt | 123/196 S |
| 4,869,346 | 9/1989 | Nelson | 123/196 S |
| 5,203,429 | 4/1993 | Zager | 123/196 R |
| 5,238,085 | 8/1993 | Engelmann | 123/196 S |
| 5,353,760 | 10/1993 | Zager | 184/1.5 |

*Primary Examiner*—Henry C. Yuen
*Assistant Examiner*—Erick Solis
*Attorney, Agent, or Firm*—Hardaway

[57] ABSTRACT

An oil cleaning and recycling system (1) is provided for automatically metering a predetermined amount of engine lubricating oil into a diesel fuel supply of a diesel engine (88) as the engine (88) operates. A pump (10), communicating with a lubrication system of engine (88) and with a fuel tank (86), is intermittently operable in response to a regular, periodic signal generated by a control module (40). A control solenoid (36) admits air into pump (10) upon each such signal, thereby causing a piston (18) in the pump (10) to travel upwardly to discharge a preloaded amount of oil into a fuel return line (90) to produce a mixture subsequently consumed in the engine (88) as fuel. The pump (10) is provided with an air-actuated valve assembly (22) to direct flow of oil into and out of a cylinder (12) and with an indicator rod (20) enabling a user to visually determine that the system (1) is in working condition. The system (1) also includes a testing mechanism, including a button (82), manually activating the system (1) to confirm that it is in working condition prior to operation during transit.

11 Claims, 3 Drawing Sheets

OIL CLEANING AND RECYCLING SYSTEM

BACKGROUND OF THE INVENTION

This invention relates to an improved system for maintaining a desired quantity of clean oil in a lubrication system for an internal combustion engine, especially a diesel fuel engine.

Prior versions of such a system of which the present invention is an improvement are disclosed in two of my prior patents, U.S. Pat. Nos. 4,421,078 and 4,495,909. These systems both employ a cylinder having a solid piston which pumps a preloaded quantity of lubricant extracted from an oil pan of an internal combustion engine into a fuel return line. Two or more solenoids are utilized in each system to regulate the flow of air and lubricant into the cylinder.

Devices illustrative of the art since issuance of the latter of the above-cited patents include that taught in U.S. Pat. No. 4,869,346 to Nelson, which discloses a system for automatically changing engine lubricating oil while an internal combustion engine is running. A double-acting displacement unit in the system periodically extracts an amount of used oil from the engine lubricating system and pumps the amount to either a diesel fuel tank or to a crankcase of the engine, depending on the level of oil within the crankcase as detected by dipstick-mounted sensing means. Fresh oil is withdrawn from an oil reservoir and pumped to the crankcase. This system likewise employs a plurality of solenoids. An LED malfunction light on a controller signals potential failure of any such solenoid, as well as that of the displacement unit, upon an abnormally long time lapse between cycles. Although such an arrangement indicates improper operation, there is no means disclosed for confirming proper working order of the system so as to reduce the likelihood of a malfunction in the first place.

Further illustrative of the art is the device disclosed in U.S. Pat. Nos. 4,572,120 and 4,615,305 to Matsumoto, in which an outboard motor is provided with a lubricant delivery tank mounted thereon receiving lubricant from a remotely-positioned storage tank and delivering it to a pump whereby it is fed into the intake manifold of the motor. The pump does not, however, pump lubricant in predetermined quantities, nor is it actuated at regular periodic intervals. The disclosed system additionally possesses the shortcomings discussed previously with regard to other known systems.

It has been found desirous to implement a testing mode for an oil cleaning and recycling system such that one may visually confirm that the system is in working order prior to transit of the rig upon which the system is mounted. No mechanism permitting such testing has been heretofore known. Moreover, it has been found advantageous to minimize the number of solenoids in an oil cleaning and recycling system.

SUMMARY OF THE INVENTION

It is an important object of the present invention to provide an improved system for cleaning and recycling oil in a lubrication system of a diesel fuel engine.

It is a further object of the present invention to provide an oil cleaning and recycling system which can be tested for effectiveness prior to operation in transit.

It is a further object of the present invention to provide an oil cleaning and recycling system which enables a user to see when the system is in working condition.

It is a further object of the present invention to provide an oil cleaning and recycling system which uses only one solenoid valve.

These as well as other objects are accomplished by an oil changing system for automatically metering a predetermined amount of engine lubricating oil into a diesel engine fuel supply as a diesel engine operates, comprising a fuel tank containing diesel fuel remote from the engine, a fuel return line establishing fluid communication between the engine and the fuel tank, an engine lubrication system containing lubricating oil and including an oil pan, a control module generating a regular, periodic signal at preset time intervals during engine operation, the time intervals corresponding to a predetermined oil change interval to provide for desired oil removal from the engine lubrication system, and a pump communicating with the engine lubrication system and with the fuel tank and being intermittently operable in response to the signal during engine operation for a controlled, limited duration, preferably one second, in response to each periodic signal generated to receive the predetermined amount of lubricating oil from the engine lubrication system and to transport that amount into the fuel return line for mixing of lubricating oil and diesel fuel to produce a mixture subsequently consumed in the engine as fuel.

The pump includes a sealed cylinder having closed top and bottom ends, a piston slidably mounted in the cylinder, an indicator rod fixed to the piston and protruding outwardly of the bottom end for visually confirming working condition of the system, and an air-actuated valve assembly communicating with the cylinder directing flow of the predetermined amount of lubricating oil into and out of the cylinder.

The system may additionally include an oil level maintenance mechanism for ensuring an adequate level of lubricating oil in the oil pan. Thus, lubricating oil removed by the pump is replaced such that the lubricating oil in the lubrication system maintains a substantially constant contaminant level, and the need for discrete periodic oil changes is eliminated.

A testing mechanism enables an operator to visually determine that the system is in working condition and thus to confirm proper operation of the system prior to transit.

DETAILED DESCRIPTION

In accordance with this invention, it has been found that an improved system for cleaning and recycling oil in a lubrication system of a diesel fuel engine may be provided wherein a user can physically see when a cylinder of the system is in operation and to confirm proper system operation prior to transit, and wherein the number of solenoids used is minimized.

Figure 1:
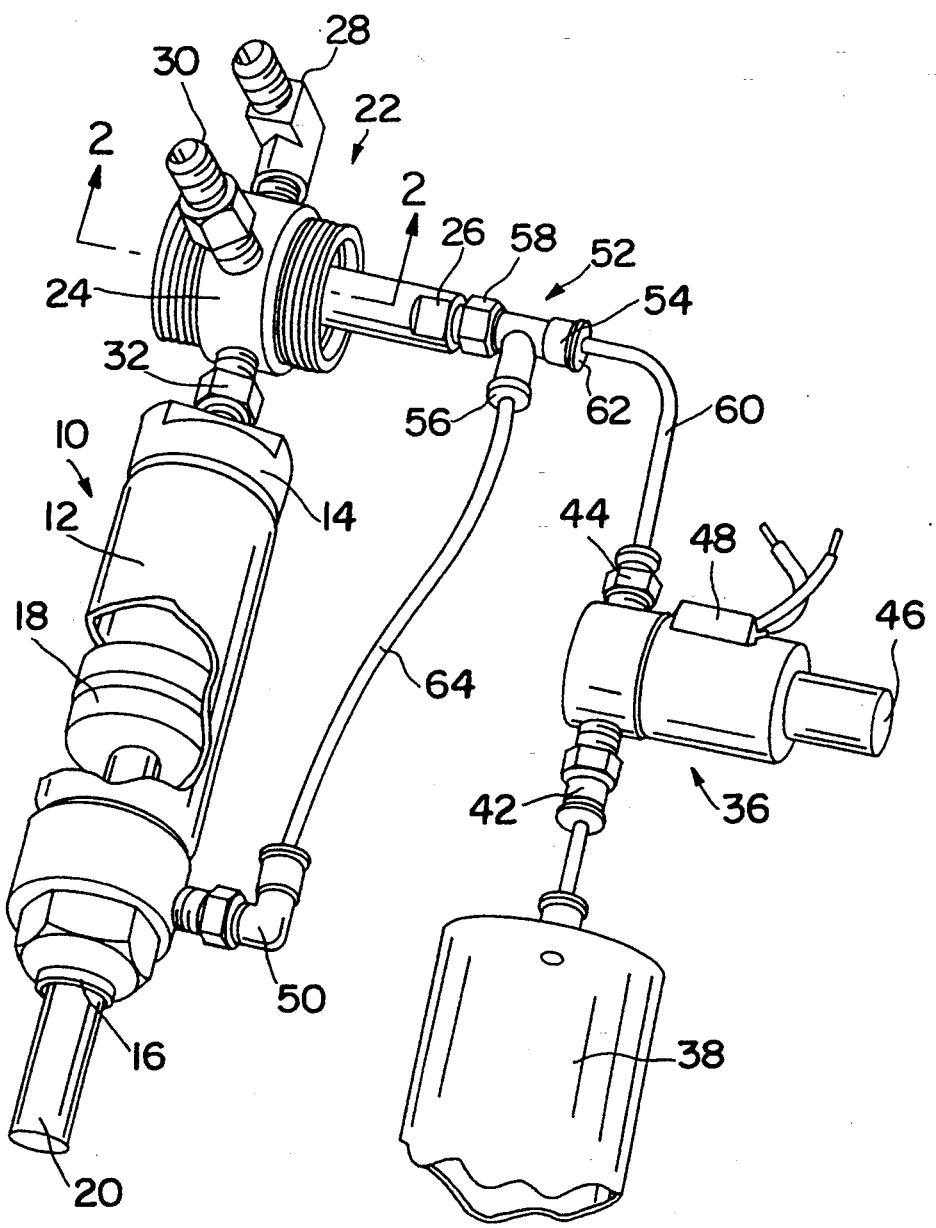
FIG. 1 is a perspective view of a pump in association with a control solenoid used in an oil cleaning and recycling system constructed in accordance with a preferred embodiment of the present invention.

FIG. 1 shows a pump 10 used in the system of the present invention. The pump 10 includes a cylinder 12 having a closed top end 14 and a closed bottom end 16 sealing the cylinder 12, a piston 18 slidably mounted in the cylinder 12, and an indicator rod 20 fixed to the piston 18 and protruding outwardly through a bore in the bottom end 16, enabling a user to visually confirm that the system is in working condition. The pump 10 further includes and an air-actuated valve assembly 22 communicating with the cylinder 12 directing flow of a predetermined amount of lubricating oil into and out of the cylinder 12. The air-actuated valve assembly 22 comprises a housing 24 mounted to top end 14 and communicating with an air port 26, an oil inlet port 28, an oil outlet port 30, and a cylinder port 32. A valve element 34 (FIGS. 3A to 4B) is slidably disposed in the housing 24 and will be described more fully herein.

Figure 4:
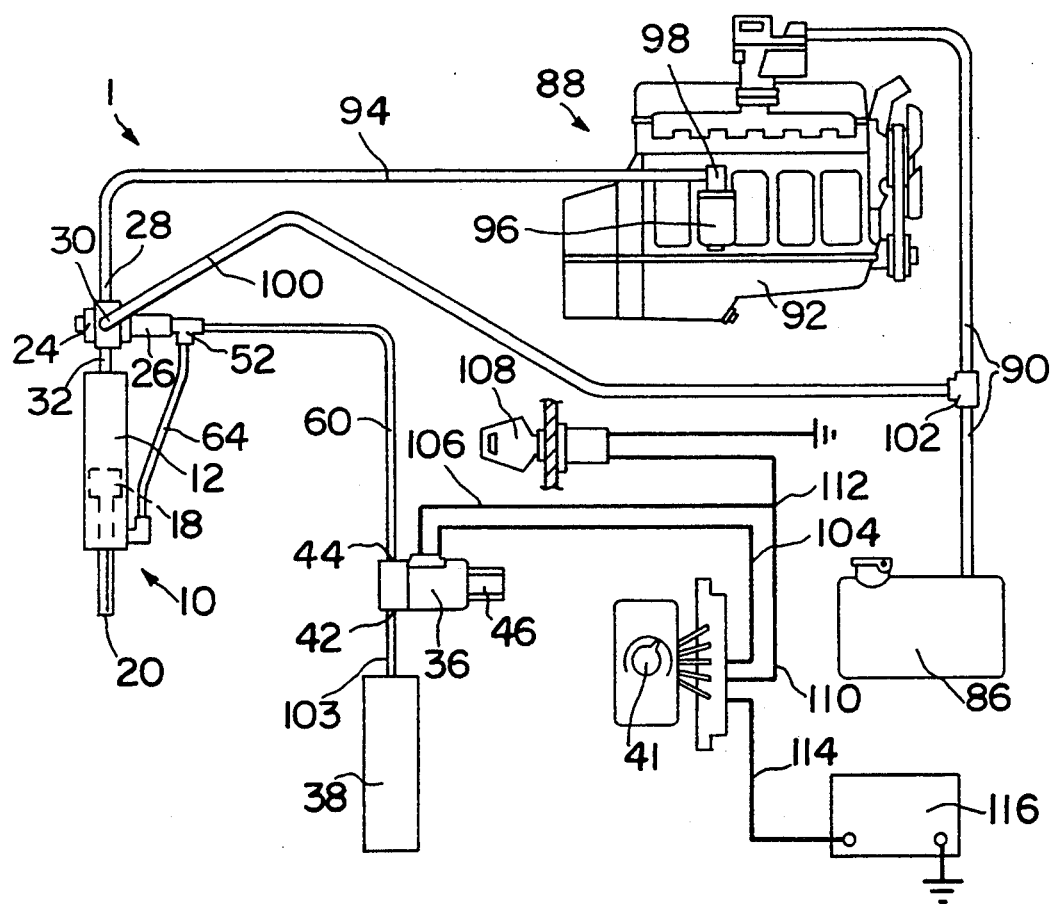
FIG. 4 is a schematic view of an oil cleaning and recycling system constructed in accordance with a preferred embodiment of the present invention.
Figure 4A:
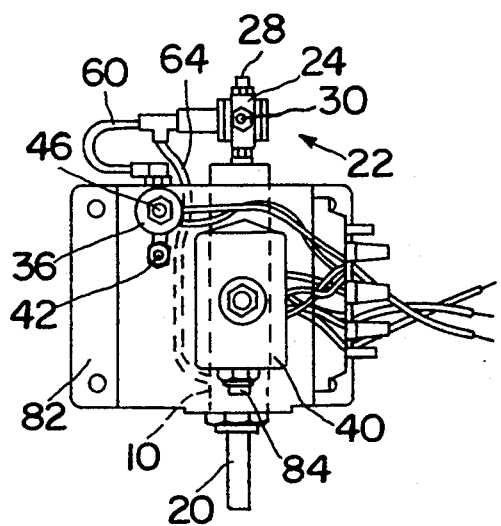
FIG. 4A is a front view of, among other components, the control module illustrated in FIG. 4 as mounted on a mounting bracket.

Shown in association with the pump 10 in FIG. 1 is a control solenoid 36 governing flow of air from an air reservoir 38 into cylinder 12 and energized intermittently in response to a regular, periodic signal generated by a control module 40 (FIG. 4A). The control solenoid 36 is provided with a first port 42 receiving air from air reservoir 38, a second port 44, and a vent 46. Also provided is a wire block 48 connecting leads to the control solenoid 36, as will be more fully explained herein. In its normal, non-energized state, control solenoid connects second port 44 and vent 46; in its energized state, it connects first port 42 and second port 44.

As seen in FIG. 1, a bottom port 50 extends radially outwardly from cylinder 12 proximate bottom end 16. A T-shaped connector 52 having an upper portion 54 and a lower portion 56 communicates with air port 26 at end 58 of upper portion 54. A first conduit 60 connects second port 44 of control solenoid 36 and an end 62 of upper portion 54, and a second conduit 64 connects bottom port 50 and lower portion 56 of the T-shaped connector 52.

Figure 2A:
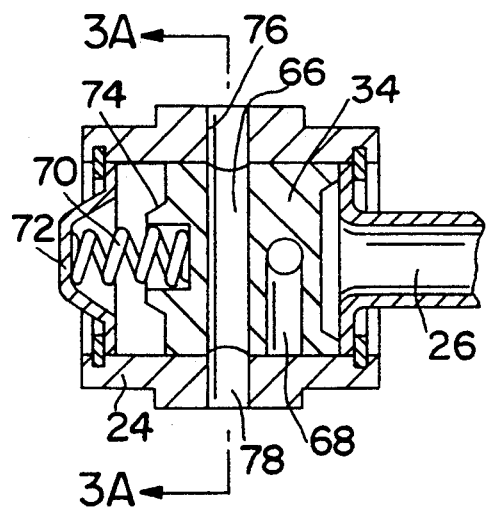
FIG. 2A is a sectional elevation view taken along line 2—2 in FIG. 1, showing a valve element in its normal position assumed when the control solenoid is de-energized.
Figure 3A:
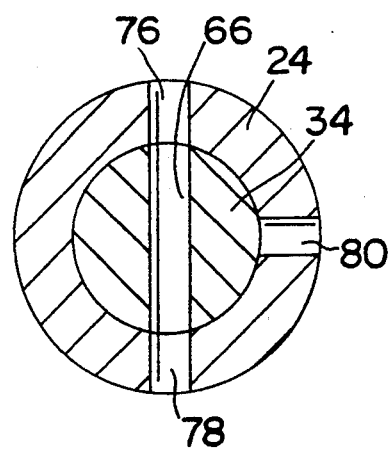
FIG. 3A is a sectional elevation view taken along line 3A—3A in FIG. 2A.

Referring to FIGS. 2A and 3A, the valve element 34 is shown seated within housing 24 of the air-actuated valve assembly 22. The valve element 34 is preferably a cylindrical member through which are formed first and second passageways 66 and 68, respectively. A resilient spring 70 is disposed between end 72 of housing 24 and end 74 of valve element 34, biasing valve element 34 in a position aligning first passageway 66 with apertures 76 and 78 corresponding to oil inlet port 28 and cylinder port 32, respectively, thereby providing fluid communication between these ports. As shown in FIG. 3A, valve element 34 in this position precludes fluid communication with aperture 80 corresponding to oil outlet port 30.

Figure 2B:
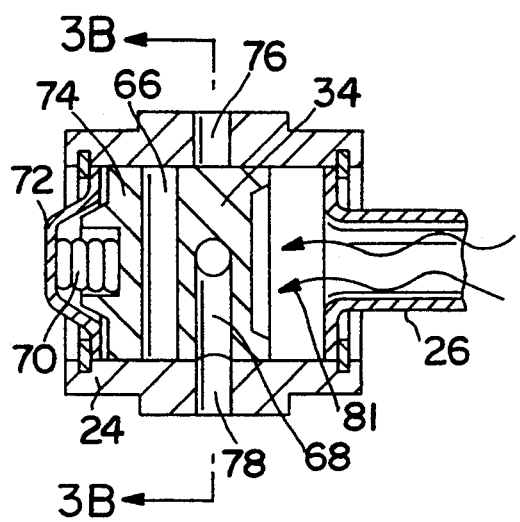
FIG. 2B is a sectional elevation view taken along line 2—2 in FIG. 1, showing the valve element in its actuated position assumed when the control solenoid is energized.
Figure 3B:
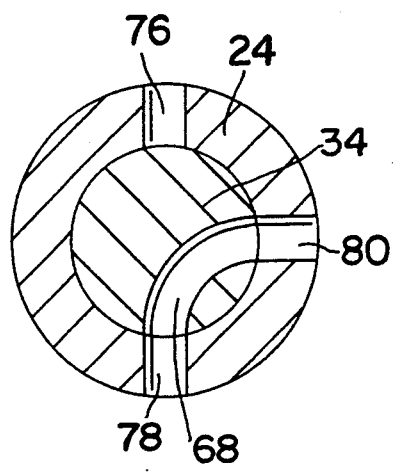
FIG. 3B is a sectional elevation view taken along line 3B—3B in FIG. 2B.

Referring to FIGS. 2B and 3B, valve element 34 is shown displaced to the left from its position of FIG. 2A by pressurized air 81 passing through air port 26 and into housing 24, pressing against valve element 34 to oppose the force of spring 70, now in a compressed state. In this position, second passageway 68 is aligned with apertures 78 and 80, thereby providing fluid communication between cylinder port 32 and oil outlet port 30. As shown in FIG. 3B, valve element 34 now precludes fluid communication with aperture 76.

Thus, energizing control solenoid 36 (FIG. 1) causes air to flow through first and second ports 42 and 44, respectively, first conduit 60, and T-shaped connector 52, which branches the air flow into both cylinder 12 via second conduit 64 and valve assembly 22 via air port 26. Piston 18 is thereby actuated upwardly while valve element 34 is simultaneously actuated as described with regard to FIGS. 2B & 3B.

Referring to FIG. 4, a schematic diagram of the oil cleaning and recycling system 1 constructed in accordance with the preferred embodiment of the present invention is shown. The system 1 includes a fuel tank 86 containing diesel fuel remote from a diesel engine 88, a fuel return line 90 establishing fluid communication between fuel tank 86 and engine 88, and an engine lubrication system containing lubricating oil and including an oil pan 92. An oil supply line 94 connects oil inlet port 28 to a source of pressurized oil, such as oil galley 96 at port 98. An oil discharge line 100 connects oil outlet port 30 to a T-connector 102 joining sections of fuel return line 90. A third conduit 103 connects first port 42 of control solenoid 36 to air reservoir 38.

If desired, the system 1 may be additionally provided with an oil level maintenance mechanism for ensuring an adequate level of lubricating oil in oil pan 92. Such a mechanism, periodically adding quantities of fresh oil into the engine 88, is not shown herein, but is preferably of the type described in my U.S. Pat. Nos. 4,421,078 and 4,495,909, the disclosures of which are hereby incorporated by reference.

Control module 40 generates a regular, periodic signal at preset time intervals during engine operation which correspond to a predetermined oil change interval, providing for desired oil removal from the engine lubrication system. An impulse timer within the control module 40 dictates the frequency at which a signal is generated. Varying frequencies can be selected by changing the position of a dial 41 located on the control module 40. Pump 10 is intermittently operable in response to this signal during engine operation. This is provided through the electrical connections associated with the control module 40 and control solenoid 36. Specifically, a lead 104 connects control solenoid 36 to control module 40. A lead 110 runs from control module 40 to ignition switch 108 and is connected to a lead 106 from control solenoid 36 at node 112. A lead 114 connects control module 40 to a constant power source 116.

FIG. 4A illustrates the control module 40 mounted upon a mounting bracket 82, together with pump 10 and control solenoid 36. Preferably, valve element 22 extends beyond a top edge of the bracket 82, while indicator rod 20 extends beyond a bottom edge of the bracket 82.

Control module 40 may be provided with a push button 84 closing a circuit within control module 40 to energize control solenoid 36. This provides a testing mechanism manually activating the oil cleaning and recycling system 1 to confirm working condition of the system prior to operation during transit of a rig upon which the system is mounted. The term "manually" as used herein means that the system 1 in the testing mode does not execute a cycle responsive to any signal from the control module 40 but does so only when button 84 is pressed.

Pushing of button 84 initiates one full test cycle; the piston 18 is actuated upwardly as described above, whereupon one may see indicator rod 20 retract into the cylinder 12, then be actuated downwardly by oil entering the cylinder 12, as will be more fully described herein, whereupon the indicator rod 20 is seen extending from the cylinder 12. The engine must be running during the testing mode so as to pressurize the oil flowing into cylinder 12.

OPERATION OF SYSTEM OF PREFERRED EMBODIMENT

When the vehicle is started at ignition switch 108, the impulse timer within the control module 40 begins running. During this time, oil supply line 94 is pressurized by engine 88 and because control solenoid 36 has not yet been energized, piston 18 is pushed downwardly in the cylinder 12 of pump 10 by oil flowing through line 94, oil inlet port 28, through housing 24, and into the cylinder 12. At this time, the valve element 34 in housing 24 assumes the position described with respect to FIGS. 2A and 3A, providing the fluid communication between ports 28 and 32. As piston 18 is pushed downwardly, displaced air behind it exits the cylinder 12 via second conduit 64, T-shaped connector 52, and first conduit 60, whereupon it enters control solenoid 36 at second port 44 and exits therefrom to the atmosphere through vent 46. Thus, a predetermined amount of oil from oil pan 92 is received by pump 10 when piston 18 has reached its limit of downward travel.

Upon lapse of a preset time interval, preferably one second, control module 40 energizes control solenoid 36 such that it opens first port 42 and closes vent 46, whereby ports 42 and 44 are now in fluid communication with one another. Pressurized air therefore flows from air reservoir 38, through third conduit 103 and control solenoid 36, and into first conduit 60. Piston 18 is thereby actuated upwardly in the manner previously described to force the predetermined amount of oil out of the pump 10, that is, through port 30 and into oil discharge line 100. The discharged amount of oil is transported by line 100 into T-connector 102, whereupon it enters the fuel return line 90. Upon reaching the fuel return line 90, the oil easily mixes with the relatively warm returning fuel so as to produce a homogeneous mixture which may be easily burned and which resists separation upon return to fuel tank 86.

After a period of time (e.g., seven seconds) sufficient to permit discharge of the entire amount of oil from the pump 10 into the fuel line 90, control solenoid 36 is de-energized, closing first port 42 to pressurized air from air reservoir 38. Pump 10 is then ready for another cycle of oil reception and discharge.

It is therefore seen that an oil cleaning and recycling system may be provided wherein a user can visually determine that the system is in working condition and can test the system prior to operation in transit. Furthermore, the system is simplified in its employment of only a single solenoid.

As the above description is merely exemplary in nature, being merely illustrative of the invention, many variations will become apparent to those of skill in the art. Such variations, however, are included within the spirit and scope of this invention as defined by the following appended claims.

That which is claimed:

1. An oil cleaning and recycling system for automatically metering a predetermined amount of engine lubricating oil into a diesel engine fuel supply as a diesel engine operates, comprising:
    a fuel tank containing diesel fuel remote from said engine;
    a fuel return line establishing fluid communication between said engine and said fuel tank;
    an engine lubrication system containing lubricating oil and including an oil pan;
    a control module generating a regular, periodic signal at preset time intervals during engine operation, said time intervals corresponding to a predetermined oil change interval to provide for desired oil removal from said engine lubrication system; and
    a pump communicating with said engine lubrication system and with said fuel tank, said pump being intermittently operable in response to said signal during engine operation for a controlled, limited duration in response to each periodic signal generated to receive said predetermined amount of said lubricating oil from said engine lubrication system and to transport said amount into said fuel return line for mixing of lubricating oil and diesel fuel to produce a mixture subsequently consumed in said engine as fuel;
    said pump including a sealed cylinder having closed top and bottom ends, a piston slidably mounted in said cylinder, an indicator rod fixed to said piston and protruding outwardly through a bore in said bottom end for visually confirming working condition of said system, and an air-actuated valve assembly communicating with said cylinder directing flow of said predetermined amount of said lubricating oil into and out of said cylinder;
    whereby lubricating oil removed by said pump is replaced such that the need for periodic oil changes is eliminated and a user can visually determine that said system is in working condition.

2. The system set forth in claim 1 further comprising a control solenoid governing flow of pressurized air from an air reservoir into said cylinder and energized intermittently in response to said regular, periodic signal generated by said control module.

3. The system set forth in claim 2 wherein said air-actuated valve assembly comprises:
    a housing mounted to said top end of said cylinder, said housing communicating with an air port, an oil inlet port, an oil outlet port, and a cylinder port; and
    a valve element slidably disposed in said housing.

4. The system set forth in claim 3 wherein said valve assembly further comprises a resilient spring biasing said valve element in a first position providing fluid communication between said cylinder port and said oil inlet port.

5. The system set forth in claim 4 wherein said control solenoid has first port receiving air from said air reservoir, a second port, and a vent, whereby said control solenoid normally connects said second port and said vent and when energized connects said first port and said second port.

6. The system set forth in claim 5 further comprising:

a bottom port extending radially outwardly from said cylinder proximate said bottom end of said cylinder;

a T-shaped connector having an upper portion and a lower portion, one end of said upper portion communicating with said air port of said valve assembly;

a first conduit connecting said second port of said control solenoid and another end of said upper portion of said T-shaped connector; and a second conduit connecting said bottom port and said lower portion of said T-shaped connector;

whereby energizing said control solenoid causes pressurized air from said air reservoir to flow through said first and second conduits and into said cylinder and said valve assembly such that said piston is actuated upwardly while said valve element is simultaneously actuated in a direction opposing force of said spring to assume a second position providing fluid communication between said cylinder port and said oil outlet port.

7. The system set forth in claim 1 further comprising a testing mechanism causing actuation of said pump to confirm working condition of said system prior to operation in transit.

8. The system set forth in claim 7 wherein said testing mechanism includes a button closing a circuit to energize a control solenoid.

9. An oil cleaning and recycling system for automatically metering a predetermined amount of engine lubricating oil from an engine lubrication system into a diesel engine fuel supply as a diesel engine operates, comprising:

a pump communicating with said engine lubrication system and with said fuel tank, said pump including a cylinder and a piston; and a testing mechanism causing actuation of said pump to confirm proper working condition of said system prior to operation in transit.

10. The system set forth in claim 9 further comprising an indicator associated with said pump, whereby said indicator allows an operator to visually determine whether said system is in proper working condition.

11. The system set forth in claim 10 wherein said indicator is a piston rod communicating with said piston.

* * * * *